(12) United States Patent
Pfeifle

(10) Patent No.: US 9,934,289 B2
(45) Date of Patent: *Apr. 3, 2018

(54) FUZZY FULL TEXT SEARCH

(71) Applicant: HERE Global B.V., Eindhoven (NL)

(72) Inventor: Martin Pfeifle, Seewald (DE)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/995,724

(22) Filed: Jan. 14, 2016

(65) Prior Publication Data

US 2016/0132565 A1 May 12, 2016

Related U.S. Application Data

(63) Continuation of application No. 13/314,416, filed on Dec. 8, 2011, now Pat. No. 9,262,486.

(51) Int. Cl.
*G06F 7/00* (2006.01)
*G06F 17/30* (2006.01)
*G06F 13/14* (2006.01)

(52) U.S. Cl.
CPC .. *G06F 17/30542* (2013.01); *G06F 17/30625* (2013.01); *G06F 17/30675* (2013.01)

(58) Field of Classification Search
CPC ......... G06F 17/30327; G06F 17/30091; G06F 17/30622; G06F 17/30958; G06F 17/30985; G06F 17/30011; G06F 17/30017; G06F 17/30312; G06F 17/30321; G06F 17/30619; G06F 17/30696; G06F 17/30946; G06F 17/03; G06F 17/30905; G06F 17/30477; G06F 17/30634; G06F 17/3002; G06F 17/30247; G06F 17/30265; G06F 17/30867; G06F 17/30979; G06F 11/0766;
(Continued)

(56) References Cited

U.S. PATENT DOCUMENTS 5,815,096 A * 9/1998 Smith ................. H03M 7/3088
341/51
6,636,849 B1 10/2003 Tang et al.
(Continued)

FOREIGN PATENT DOCUMENTS

EP 1197885 4/2002
WO WO2008043582 4/2008

OTHER PUBLICATIONS

Search Report and Written Opinion cited in PCT/EP2012/072546, dated Mar. 14, 2013.
(Continued)

*Primary Examiner* — Kris Mackes
*Assistant Examiner* — Cecile Vo
(74) *Attorney, Agent, or Firm* — Alston & Bird LLP

(57) ABSTRACT

A method and system for fuzzy full text search is disclosed. The system includes an inverted index where tokens are organized in a Next Valid Character (NVC) tree. Each path through the tree defines a token. The document lists for the tokens are stored at leaf nodes. When performing a fuzzy full text search, the system uses an edit distance greater than zero. After receiving search tokens, the system traverses the NVC tree to generate document error lists. The system then compares the error lists to identify relevant document identifiers and provides a result set.

20 Claims, 4 Drawing Sheets

(58) Field of Classification Search
CPC ............. G06F 11/0787; G06F 17/2223; G06F 17/30522; G06F 17/2247; G06F 17/30241; G06F 17/30625; G06F 17/30961; G06F 17/30076; G06F 17/30569; G06F 17/30657; G06F 17/3066; G06F 17/30675; G06F 17/30964; G06F 17/30997; H03M 7/3088
USPC ................. 707/769, E17.014, 797, E17.012, 707/E17.044, E17.083, 741, 742, 707/E17.086, E17.089, 737, 743, 780, 707/803, 999.003, E17.075, E17.061, 707/999.004, 999.005, E17.017, E17.046, 707/E17.108, E17.115, E17.128, E17.019, 707/E17.091, E17.092, E17.14, 736, 749, 707/750, 760, 798, 758, 999.006, 707/E17.087, E17.001, E17.018, 755, 707/770, E17.008, 752, E17.058, E17.07, 707/E17.135, 802
See application file for complete search history.

(56) References Cited

U.S. PATENT DOCUMENTS

| | | | |
|---|---|---|---|
| 6,697,794 B1 * | 2/2004 | Milby | ............... G06F 17/30342 707/702 |
| 7,814,107 B1 | 10/2010 | Thirumalai et al. | |
| 8,280,723 B1 | 10/2012 | Laaser | |
| 2006/0200340 A1 | 9/2006 | Fontenelle et al. | |
| 2007/0260595 A1 * | 11/2007 | Beatty | ............... G06F 17/30964 |
| 2008/0133473 A1 | 6/2008 | Broder et al. | |
| 2010/0010989 A1 * | 1/2010 | Li | ..................... G06F 17/30675 707/E17.017 |
| 2010/0070542 A1 | 3/2010 | Feinsmith | |
| 2010/0198612 A1 | 8/2010 | Streepy, Jr. | |
| 2010/0325136 A1 * | 12/2010 | Chaudhuri | ............ G06F 17/276 707/759 |
| 2011/0106814 A1 | 5/2011 | Okato et al. | |
| 2011/0320481 A1 * | 12/2011 | Huang | ................ G06F 17/2223 707/769 |
| 2012/0166403 A1 | 6/2012 | Kim et al. | |
| 2013/0054927 A1 | 2/2013 | Raj et al. | |
| 2013/0262485 A1 | 10/2013 | Li et al. | |

OTHER PUBLICATIONS

Search Report and Written Opinion cited in PCT/EP2012/072547, dated Mar. 14, 2013.
United States Patent and Trademark Office, Notice of Allowance for U.S. Appl. No. 13/314,416, dated Oct. 7, 2015, 10 pages, U.S.A.
United States Patent and Trademark Office, Office Action for U.S. Appl. No. 13/314,416, dated Mar. 5, 2015, 20 pages, U.S.A.
United States Patent and Trademark Office, Office Action for U.S. Appl. No. 13/314,416, dated Jun. 4, 2014, 17 pages, U.S.A.
United States Patent and Trademark Office, Office Action for U.S. Appl. No. 13/314,416, dated Oct. 25, 2013, 17 pages, U.S.A.
United States Patent and Trademark Office, Office Action for U.S. Appl. No. 13/314,416, dated Mar. 19, 2013, 12 pages, U.S.A.

* cited by examiner

FUZZY FULL TEXT SEARCH

This application is a continuation under 35 U.S.C § 120 and 37 CRF § 1.53(b) of U.S. patent application Ser. No. 13/314,416 (now U.S. Pat. No. 9,262,486) filed Dec. 8, 2011, the disclosure of which is incorporated herein by reference in its entirety.

REFERENCE TO RELATED APPLICATIONS

The present patent application is related to co-pending patent application Ser. No. 13/314,412, entitled "OPTIMALLY RANKED NEAREST NEIGHBOR FUZZY FULL TEXT SEARCH," filed on Dec. 8, 2011.

FIELD

The present invention relates generally to full text search, and more particularly, relates to fuzzy full text search.

BACKGROUND

Full text search (FTS) systems search for relevant documents based on key words entered by a system user. The user enters a set of terms, referred to as tokens, and the FTS system finds documents containing all of the terms in the set. In order to support queries efficiently, the FTS system typically uses inverted indexes. For example, Lucene (described at http://lucene.apache.org/) and SQLite's FTS module (described at http://www.sqlite.org/cvstrac/wiki?p=FtsUsage) are both FTS systems that use inverted indexes.

An inverted index assigns a set of document identifiers to each token. The document identifiers are associated with documents that include the token at least once. Upon receiving a search request, the FTS system selects the set of document identifiers for each token in the request and then compares the document sets to each other. If a document identifier is contained in all document sets, the FTS system provides the document identifier in a result set of all identifiers contained in all document sets.

From a logical point of view, the inverted index can be regarded as a relation InvertedIndex(Term,DocID) with a combined index on Term and DocId. If a user of the FTS system enters the token "Neuschwanstein," the inverted index allows the FTS system to efficiently execute queries such as the following query.

SELECT DocID FROM InvertedIndex WHERE Term='Neuschwanstein' However, if the user misspells "Neuschwanstein," SQLite's FTS system will not find any relevant documents. That is because SQLite's FTS system does not support fault-tolerant (or fuzzy) searching.

Lucene's FTS system does support fuzzy search. However, Lucene performs a fuzzy search in two steps. First, Lucene searches for tokens stored in the database that are similar to the query tokens. To determine if tokens are similar, Lucene computes an edit distance (also referred to as a Levenshtein Distance) from the query tokens to the tokens stored in the database. Second, Lucene uses the similar tokens it finds as new query tokens to retrieve relevant documents. This two-step process may result in severe performance problems.

SUMMARY

A method and system for performing a fuzzy full text search is described. The system uses an inverted token Next Valid Character (NVC) tree. Each path through the tree defines a token. Document sets for the tokens are stored in leaf nodes. The system traverses the tree in a single pass to identify relevant document sets. The system intersects the document sets to generate a result set.

The system uses the same index structure, the inverted token NVC tree, for both full text search and fuzzy full text search. For full text search, an error value of zero is used, while for fuzzy full text search an error value greater than zero is used.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
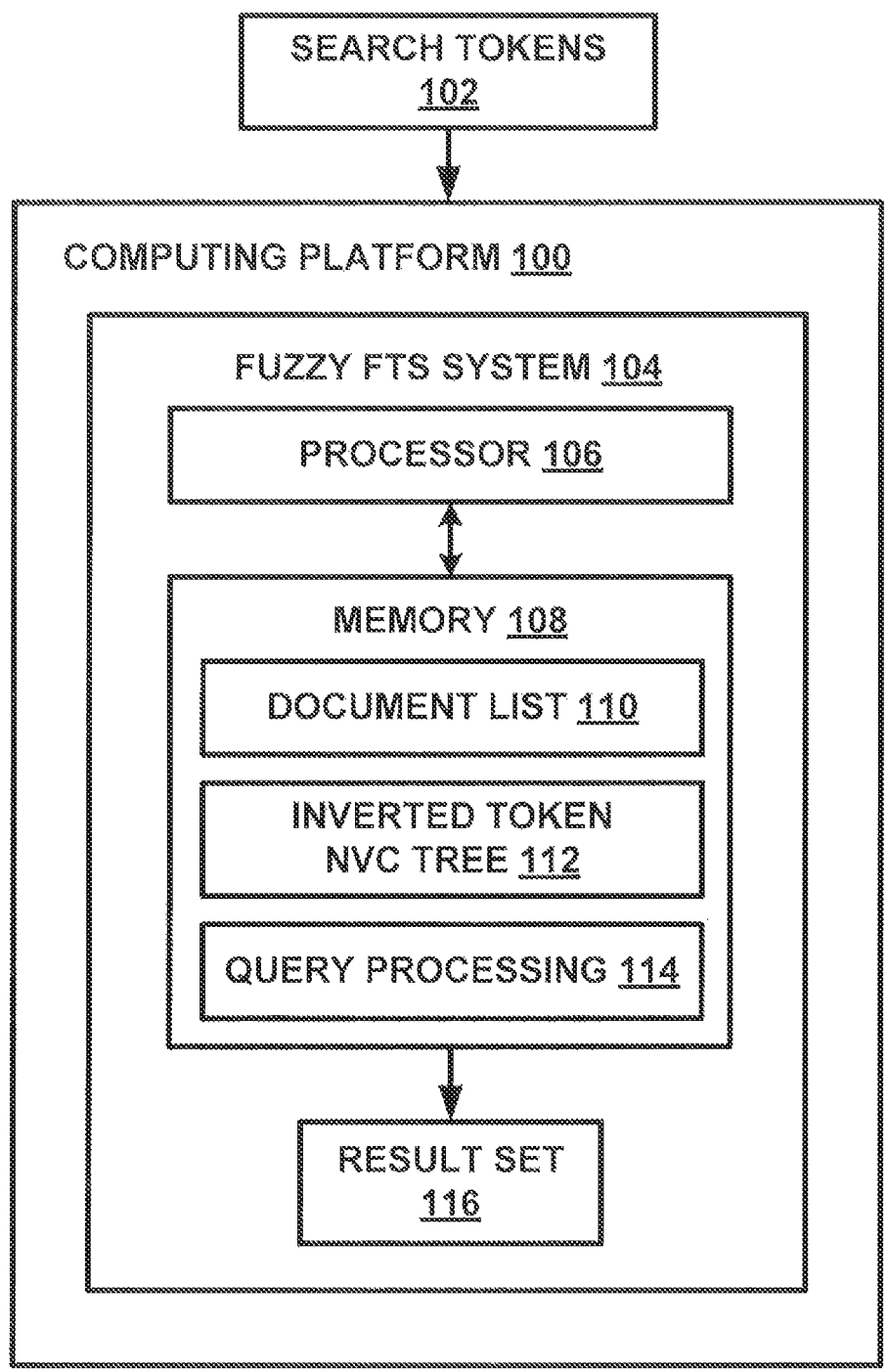
FIG. 1 is a block diagram of a fuzzy full text search system, according to an example.

FIG. 1 depicts a block diagram of a computing platform 100. The computing platform 100 may be a mobile telephone, a navigation system, a tablet computer, a personal computer, or any other computer. The computing platform 100 is a combination of hardware and software components.

The computing platform 100 includes a fuzzy Full Text Search (FTS) system 104. The computing platform 100 may also include other sub-systems. For example, if the computing platform 100 is a navigation system, the computing platform 100 may also include a positioning system, a user interface, a geographic database, and software that facilitates destination entry, route calculation, route guidance, map display, and other navigation functions and features.

The fuzzy FTS system 104 may be a combination of hardware and software components. For example, the fuzzy FTS system 104 includes a processor 106 and memory 108 for storing a document list 110, an index 112, query processing 114, and possibly other information. In other examples, the fuzzy FTS system 104 may be a software system and use a processor and memory associated with the computing platform 100.

The computing platform 100 receives search tokens 102 entered by a user of the platform 100 and provides the search tokens 102 to the fuzzy FTS system 104. For example, a user of a navigation system may enter search terms associated with an address to identify a destination. As a result of the query processing 114, the fuzzy FTS system 104 provides a result set 116 as an output. The navigation system may use this result set to provide a list of relevant destinations to the user.

The document list 110 is a list of document identifiers and tokens located within documents associated with the identifiers. The term "document" in this context means any kind of electronic data record or file that contains text. In the example of a navigation system, relevant documents may be a segment record, a node record, a point of interest record, or any other record stored in a geographic database.

The document list 110 includes a document identifier column and a token column. The document identifier column includes data representing document identifiers. Document identifiers may be any combination of letters, numbers, and other characters. The document identifiers reference documents that may be stored in the memory 108. Alternatively, the documents may be stored elsewhere on the computing platform 100 or on another system.

The token column includes terms located in the document associated with a document identifier. Each term in the token column may be used as a search token.

The document list 110 may be stored in memory 108 as a sequence of document identifiers. As another example, the document list 110 may be stored in memory 108 as a bit vector. The length of the bit vector is equal to the number of documents identified in the document identifier column. If a term is located in a certain document, the bit vector includes a 1-Bit and if the term is not located in that document, the bit vector includes a 0-Bit (or vice versa). If the document list 110 is stored as a bit vector, the intersection of document lists may be performed by intersecting the bit vectors.

Figure 2:
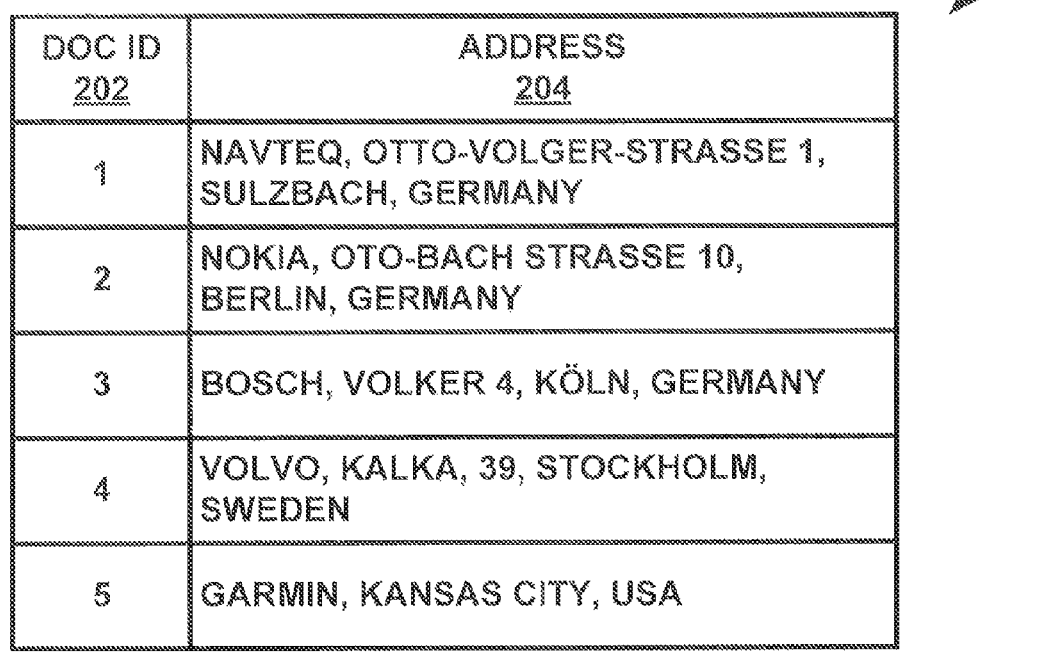
FIG. 2 is a document list, according to an example.

FIG. 2 depicts an example document list 200. In this example, the document list 200 includes a document identifier column 202 and an address column 204. The document identifiers in the document identifier column 202 are associated with terms in an address. For example, document identifier 5 is associated with the terms "Garmin," "Kansas," "City," and "USA."

The document list 200 may be used by a navigation system or an on-line mapping application during destination search. Other document lists may include terms relevant for other types of computing platforms and/or applications. For example, the token column may include data regarding books, music, web pages, files, and so on.

Figure 3:
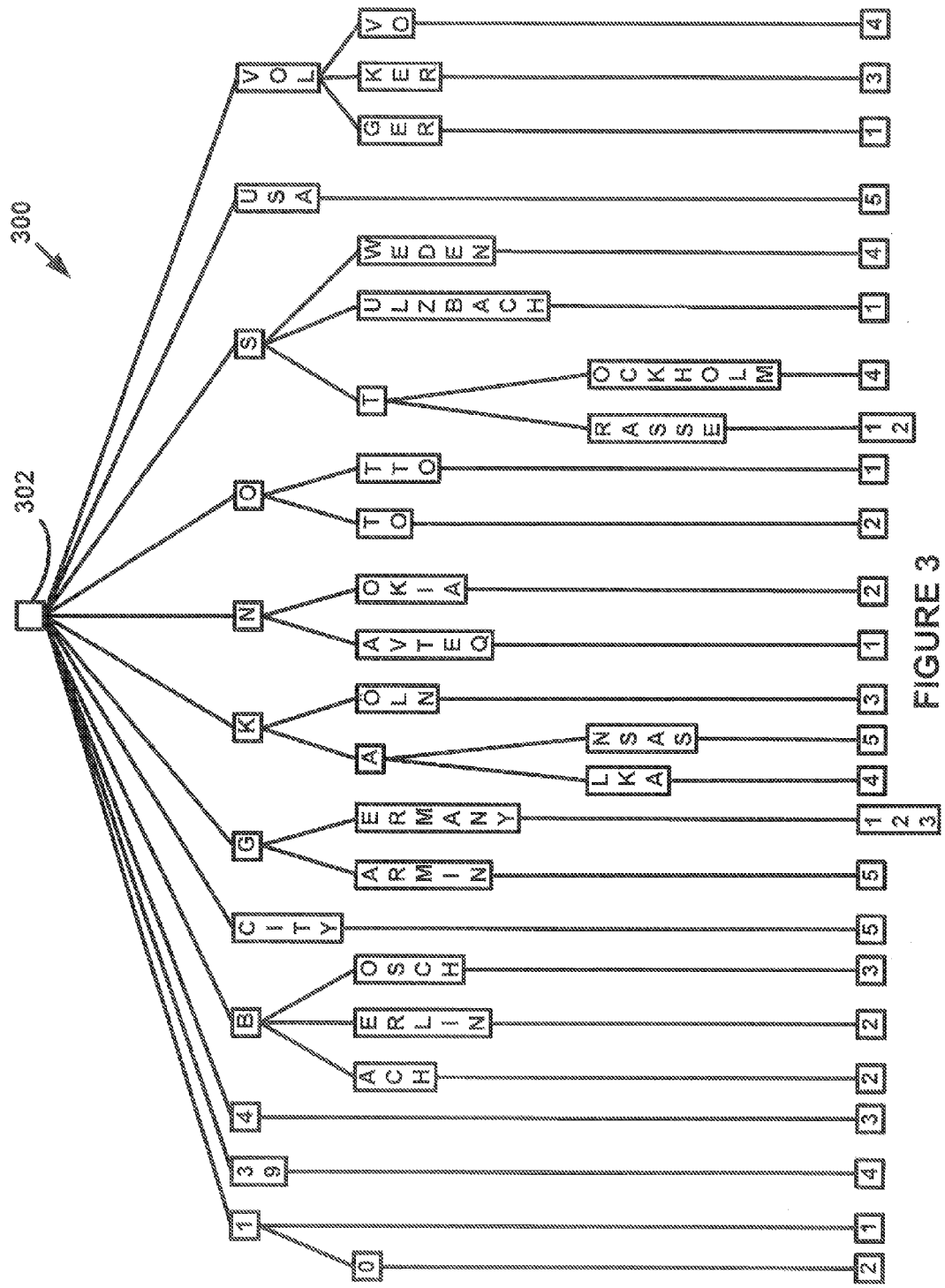
FIG. 3 is an inverted index where tokens are organized in a Next Valid Character (NVC) tree, according to an example.

Returning to FIG. 1, the index 112 is an inverted token Next Valid Character (NVC) tree. FIG. 3 depicts an index 300 where tokens are organized in a NVC tree using the document list 200 depicted in FIG. 2.

The node 302 in the tree 300 is the root node, which is also referred to as the starting node. Branches extend from the root node 302 to additional nodes. The root node 302 is the parent node to the next layer of nodes (i.e., nodes 1, 39, 4, B, CITY, G, K, N, O, S, USA, VOL), which are referred to as children nodes. In some cases, the children nodes are parent nodes to other nodes. For example, the B node is the parent node to the ACH, ERLIN, and OSCH nodes.

After following the paths from the root node through the branches and other nodes, the paths end at leaf nodes. Leaf nodes are nodes without children and are sometimes referred to as end nodes. At each leaf node is a set of document identifiers. In this example, the leaf nodes refer to the document identifiers in FIG. 2. A path from the root node 302 to a leaf node defines a token. In this example, each token is a token from the address column 204 of the document list 200.

For example, assume that a user enters the search terms OTTO, VOLGER, and GERMANY into the computing platform 100. Using the index 300, the path from the root node 302 to a leaf node for the token OTTO results in a leaf node associated with document identifier 1. Similarly, VOLGER results in a leaf node associated with document identifier 1 and GERMANY results in a leaf node associated with document identifiers 1, 2, and 3. The query processing 114 intersects the lists of document identifiers and provides document identifier 1 as the result set 116.

Returning to FIG. 1, the index 112 may be stored in memory 108 in a file or as a set of files. Alternatively, the index 112 may be stored in memory 108 as a relation containing a binary large object (BLOB). A BLOB is a collection of binary data stored as a single entity in a database management system. As both files and BLOBs can become large, the index 112 may be split into several smaller files or BLOBs. The files are stored in a file system, while the BLOBs are stored in one or more relational tables.

The index 112 may also be stored in a relation, such as NVC(FatherNode integer, SonNode integer, SonData BLOB). In this example, the father and son node values are integer values describing the NVC tree structure. The SonData values are the prefixes stored in the NVC tree. If a node is a leaf node, the SonNode value is null (or 0 if null values are not allowed in a column belonging to the primary key). If a node is a leaf node, SonData value is the document list. An example NVC relation for the index 300 is shown as follows.

| FatherNode | SonNode | SonData |
|---|---|---|
| 1 | 2 | "1" |
| 1 | 3 | "39" |
| 1 | 4 | "4" |
| 1 | 5 | "B" |
| ... | ... | ... |
| 1 | 12 | "VOL" |
| 2 | 13 | "O" |
| 2 | NULL | 1 |
| ... | ... | ... |

If the NVC tree is stored in a relation, the traversal through the tree is performed using SQL statements or other appropriate syntax.

The query processing 114 may be embodied as program instructions stored on a non-transitory computer-readable medium, which when executed by the processor 106 cause the processor 106 to carry out functions as described further herein. The program instructions may be written in a suitable computer programming language, such as C, C++, Java, or any other suitable program language now known or later developed.

The query processing 114 performs a fuzzy search for relevant document identifiers based on the entered search tokens. A fuzzy search is a fault tolerant search that allows misspelled search tokens to be used to find relevant document identifiers despite the error. Before the query processing 114 can perform a fuzzy search, the query processing 114 needs to know how much error is acceptable to the fuzzy FTS system 104.

The error is the distance between tokens in a document and query tokens entered by a user. The error is determined based on an edit distance, which is also referred to as Levenshtein distance. The Levenshtein distance between two tokens is defined as the minimum number of edit operations needed to transform one token into the other. The allowable edit operations are insertion, deletion, or substitution of a single character.

For example, the Levenshtein distance between "kitten" and "sitting" is three since it takes the following three edits to change "kitten" into "sitting" and there is no way to make the transformation with fewer than three edits.

kitten → sitten (substitution of 'k' by 's')
sitten → sittin (substitution of 'e' by 'i')
sittin → sitting (insert 'g' at the end).

The user of the computing platform 100 or other entity (e.g., designer, developer, or owner of the computing platform 100 or the fuzzy FTS system 104) may set a threshold value that determines how much error is acceptable. The edit value may be stored in memory 108, for example, as part of the query processing 114. The query processing 114 operates more efficiently with a lower threshold value than with a larger threshold value. With an error value of zero, the query processing 114 performs a non-fuzzy full text search, such as the full text search performed by SQLite.

Figure 4:
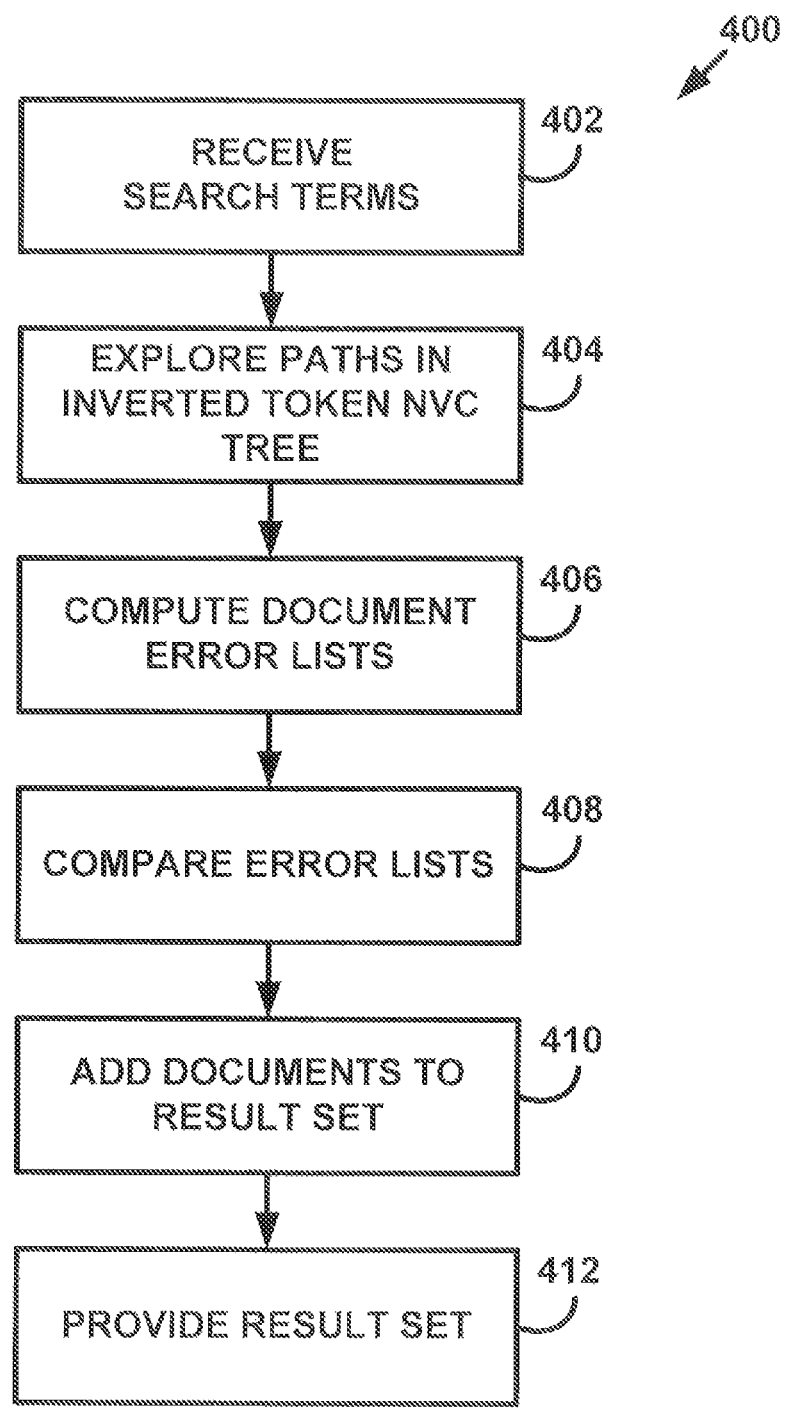
FIG. 4 is a flow diagram of a method of performing a fuzzy full text search using the fuzzy full text search system depicted in FIG. 1, according to an example.

FIG. 4 is a flow diagram of a method 400 of performing a fuzzy full text search using the fuzzy FTS system 104. In this example, the query processing 114 has received an edit distance of one. Of course, other edit distance values may be used. In this example, only one error is allowed in the entire set of entered search terms. As described later, the error threshold may be applied to search terms individually or to groups of search terms.

At block 402, the fuzzy FTS system 104 receives one or more search terms. For example, a user enters the terms OTTO and VOLKER into the computing platform 100.

At block 404, the query processing 114 explores paths in the index 112. The query processing 114 starts at the root node and follows the branches to the children nodes of the root node. Then the query processing 114 determines whether the children nodes are relevant to the entered search terms. If not, branches from these children do not need to be further explored (referred to as pruning). If the children nodes are relevant to the entered search terms, the query processing 114 continues exploring the index 112 by following the branches to the next layer of nodes. This process continues until all paths are either pruned or end at a leaf node.

At block 406, the query processing 114 computes document error lists. The document error lists include the document identifier and the number of edits needed to reach the leaf node associated with the document identifier. For example, the query processing computes the document error list of [({1}, 0), ({2}, 1)] for the search token OTTO and the document error list of [({3}, 0), ({1}, 1)] for the search term VOLKER.

The error list for OTTO identifies that zero errors were detected while exploring the path from the root node 302, to the O node, to the TTO node, and to the leaf node associated with document identifier 1. The error list for OTTO also identifies that one error was detected while exploring the path from the root node 302, to the O node, to the TO node, and to the leaf node associated with document identifier 2. The error list for VOLKER identifies that zero errors were detected while exploring the path from the root node 302, to the VOL node, to the KER node, and to the leaf node associated with document identifier 3. The error list for VOLKER also identifies that one error was detected while exploring the path from the root node 302, to the VOL node, to the GER node, and to the leaf node associated with document identifier 1.

At block 408, the query processing 114 compares the error lists. The query processing 114 may compare the first item in the error list associated with the first search token with each item in the error list associated with the next search token. Then, the query processing 114 compares the next item in the error list associated with the first search token with the error list associated with the next search token. This process continues until each item in the error lists have been compared to the other items in the error lists.

Using the error lists described with respect to block 406, the query processing 114 compares the pair ({1}, 0) for the search term OTTO with the pairs [({3}, 0), (({1}, 1)] for the search term VOLKER. Document identifier 1 is in both the OTTO pair and one of the VOLKER pairs and the overall error is 1 from the VOLKER pair. Thus, document identifier 1 is added to the result set as described with respect to block 410.

Next, the query processing 114 compares the OTTO pair ({2}, 1) with the VOLKER pair ({3}, 0) and no further match is detected. Note that the query processing 114 does not have to compare the OTTO pair ({2}, 1) to the VOLKER pair({1}, 1) as the overall error is two, which exceeds the threshold value used in this example.

At block 410, the query processing 114 adds document identifiers to the result set. The result set includes the document identifiers that are associated with data tokens that are within a pre-defined edit distance with at least one of the search tokens. As described with respect to block 408, document identifier 1 is added to the result set. Document identifier 1 is associated with both the tokens OTTO and VOLGER, which was within an edit distance of one from the entered search terms of OTTO and VOLKER.

At block 412, the fuzzy FTS system 104 provides the result set to another entity to retrieve the documents associated with the document identifiers in the result set. Alternatively, the fuzzy FTS system 104 may also have the programming to retrieve the documents and provide the documents. The documents may be stored on the computing platform 100 or another system.

In a navigation system example, the query processing 114 may provide document identifier 1 to a map display application, which then retrieves data from a geographic database associated with the navigation system. The map display application may then display a map that identifies a location associated with the address "NAVTEQ, OTTO-VOLGER-STRASSE 1, SULZBACH, GERMANY" on the user interface of the navigation system. The geographic database may be located in the navigation system or be part of another system, such as a server. In the server example, the navigation system includes a communication system that allows it to request and receive documents from the server using document identifiers.

The query processing 114 may be encapsulated in a virtual table in a similar manner as SQLite's FTS search module. In this example, the query syntax is extended by the allowed error threshold s. To create a virtual table for the addresses depicted in FIG. 2, the following command may be used.

```
CREATE VIRTUAL TABLE Addresses USING FuzzyFTS(DocID
   integer, Address TEXT)
```

To insert the addresses into the virtual table the following command may be used.

```
INSERT INTO Addresses (DocID, Address) VALUES(1, "NAVTEQ,
OTTO-VOLGER-STRASSE 1, SULZBACH, GERMANY");
INSERT INTO Addresses (DocID, Address) VALUES(2, "NOKIA, OTO-
BACH STRASSE 10, BERLIN, GERMANY");
INSERT INTO Addresses (DocID, Address) VALUES(3, "BOSCH,
VOLKER 4, KOLN, GERMANY");
```

-continued

```
INSERT INTO Addresses (DocID, Address) VALUES(4, "VOLVO,
KALKA, 39, STOCKHOLM, SWEDEN");
INSERT INTO Addresses (DocID, Address) VALUES(5, "GARMIN,
KANSAS CITY, USA")
```

With the virtual table, the query processing 114 may perform a fuzzy full text search query based on the following command.

```
SELECT * FROM Addresses WHERE Address MATCH ' ε:1(OTTO
VOLKER)';
```

This query returns all documents that have an overall edit distance within one for the two query tokens entered (OTTO and VOLKER). This example and others that follow use SQLite syntax. It is understood that other suitable commands and data structures may be used as well.

As described previously, the error threshold may be applied to a single token. For example, the query processing 114 may perform a fuzzy full text search query based on the following command.

```
SELECT * FROM Addresses WHERE Address MATCH ' ε:0(OTTO)
ε:1(VOLKER)'
```

This command requests document identifiers associated with documents that contain the token OTTO without errors and tokens that are within an edit distance of one to the term VOLKER.

For the OTTO token, the query processing 114 prunes all paths in the tree 300 that do not exactly match OTTO. For VOLKER the query processing 114 allows an error of 1. The query processing 114 then generates a result set as described with reference to FIG. 4.

As also described previously, the error threshold may be applied to a group of tokens. For example, the query processing 114 may perform a fuzzy full text search query based on the following command.

```
SELECT * FROM Addresses WHERE Address MATCH ' ε:1(OTTO)
ε:1(VOLKER, GERMAN)';
```

For the OTTO token, the query processing 114 allows an error of 1. For the VOLKER, GERMANY pair, the query processing 114 also allows an error of 1. The query processing 114 then generates a result set as described with reference to FIG. 4.

It is also possible to use tokens twice in a query. For example, the following query uses GERMANY twice, limits the error to two for the token pair OTTO, GERMANY, and limits the error to one for the token pair VOLKER, GERMANY.

```
SELECT DocID FROM Addresses WHERE Address MATCH '
ε:2(OTTO, GERMANY) ε:1(VOLKER, GERMANY)';
```

In response to this query, the query processing 114 explores the NVC tree 300 for each entered query token to find the maximum error allowed for a token. The query processing 114 prunes the tree 300 for GERMANY and OTTO with an error threshold of and for VOLKER with an error threshold of 1.

Next, the query processing 114 intersects the document sets with each other for terms that occur in brackets and, thereafter, the resulting document sets are intersected. Note that the foregoing query is semantically equivalent to the following query.

```
SELECT DocID FROM Addresses WHERE Address MATCH '
ε:2(OTTO, GERMANY)';
INTERSECT
SELECT DocID FROM Addresses WHERE Address MATCH '
ε:1(VOLKER, GERMANY)';
```

Another search variation is using token prefixes. Instead of entering the complete search terms, the user of the computing platform 100 may enter just the beginning portions of the search terms. For example, instead of entering OTTO and GERMANY, the user can enter OT and G. The query processing 114 may perform a fuzzy full text search query based on the following command.

```
SELECT DocID FROM Addresses WHERE Address MATCH ' ε:0(OT*,
G*)';
```

The query processing 114 may explore the tree 300 by pruning all non-relevant paths in the tree. The query processing 114 compares document identifier 5 (from the "G," "ARMIN," "5" path) to document identifiers 1 and 2 (from the "O," "TO," "2" and the "O," "TTO," "1" paths); and compares the document list of identifiers 1, 2, 3 (from the "G," "ERMANY," "1,2,3" path) to document identifiers 1 and 2 (from the "O," "TO," "2" and the "O," "TTO," "1" paths). Thus, the query processing adds document identifiers 1 and 2 to the result set. Changing the error value to one in this query causes the query processing 114 to explore all nodes because one error from "G*" can be any character.

The fuzzy FTS system 104 and the method 400 allow for a single pass fault-tolerant search. Moreover, the fuzzy FTS system 104 and the method 400 allows for a single index structure to be used in both non-fuzzy FTS and fuzzy FTS. The fuzzy FTS system 104 and the method 400 can be used in many different types of computing platforms for searching many types of documents.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method for performing fuzzy full text search, comprising:
   receiving a plurality of search terms, the plurality of search terms comprising a first search term and a second search term;
   identifying paths of an inverted token next valid character tree including a plurality of nodes including a root node and at least one leaf node for at least one document, wherein one or more paths from the root node to the at least one leaf node corresponds to at least one of (a) at least one first token for the first search term or (b) at least one second token for the second search term;

computing, using a processor, a plurality of document error lists corresponding to the plurality of search terms matched with the one or more paths that reach the at least one leaf node in the next valid character tree, the plurality of document error lists comprising a first document error list and a second document error list, wherein (a) the first document error list comprises one or more instances of first error list information, each instance of first error list information comprising a first document identifier and a corresponding first error distance, (b) the second error list comprises one or more instances of second error list information, each instance of second error list information comprising a second document identifier and a corresponding second error distance, (c) the first document identifier is associated with a document that comprises at least one instance of the at least one first token, and (d) the second document identifier is associated with a document that comprises at least one instance of the at least one second token;

comparing the plurality of document error lists to identify an instance of first error list information and an instance of second error list information, wherein (a) the first document identifier and the second document identifier are a common document identifier and (b) at least one of (i) the first error distance satisfies an error distance threshold and the second error distance satisfies the error distance threshold or (ii) the sum of the first error distance and the second error distance satisfies the error distance threshold;

adding the first document identifier to a result set; and
providing the result set of document identifiers.

2. The method of claim 1, wherein the plurality of search terms are geographic search terms.

3. The method of claim 1, wherein at least one of the plurality of search terms include a prefix that represents a search term.

4. The method of claim 1, further comprising:
removing at least one branch from the next valid character tree, wherein the at least one branch does not contribute to the result set.

5. The method of claim 1, wherein the threshold error distance is a limit to an edit distance calculated for at least a subset of the plurality of search terms.

6. The method of claim 1, wherein the threshold error distance is a limit to an edit distance calculated for one of the plurality of search terms.

7. The method of claim 1, further comprising:
storing an index including the next valid character tree.

8. The method of claim 7, wherein the index is a binary large object.

9. An apparatus comprising:
an interface configured to receive a plurality of search terms, the plurality of search terms comprising a first search term and a second search term;
a memory configured to store an index including an inverted token next valid character tree including a plurality of nodes including a root node and at least one leaf node for at least one document, wherein (a) one or more paths from the root node to the at least one leaf node corresponds to at least one first token for the first search term and (b) one or more paths from the root node to the at least one leaf node corresponds to at least one second token for the second search term; and
a processor configured to:
identify paths of the inverted token next valid character tree from the index to generate a plurality of document error lists corresponding to the plurality of search terms matched with the one or more paths that reach the at least one leaf node in the next valid character tree, the plurality of document error lists comprising a first document error list and a second document error list, wherein (a) the first error list comprises one or more instances of first error list information, each instance of first error list information comprising a first document identifier and a first error distance, (b) the second error list comprises one or more instances of second error list information, each instance of second error list information comprising a second document identifier and a second error distance, (c) the first document identifier is associated with a document that comprises at least one instance of the at least one first token, and (d) the second document identifier is associated with a document that comprises at least one instance of the at least one second token, compare the plurality of document error lists to identify an instance of first error list information and an instance of second error list information, wherein (a) the first document identifier and the second document identifier are a common document identifier and (b) at least one of (i) the first error distance satisfies an error distance threshold and the second error distance satisfies the error distance threshold or (ii) the sum of the first error distance and the second error distance satisfies the error distance threshold.

10. The apparatus of claim 9, wherein the processor is configured to output a result set including the common document identifiers.

11. The apparatus of claim 9, wherein the processor is configured to retrieve documents associated with the document identifiers in the result set.

12. The apparatus of claim 9, wherein the plurality of search terms are geographic search terms.

13. The apparatus of claim 9, wherein at least one of the plurality of search terms includes a prefix of that represents a search term.

14. The apparatus of claim 9, wherein the processor is configured to remove at least one branch from the next valid character tree, wherein the at least one branch does not contribute to the result set.

15. The apparatus of claim 9, wherein the threshold error distance is a limit to an edit distance calculated for at least a subset of the plurality of search terms.

16. A non-transitory computer readable medium including instructions that when executed cause one or more processors to perform:
identifying paths of a next valid character tree including a plurality of nodes including a root node and at least one leaf node for at least one document, wherein one or more paths from the root node to the at least one leaf node corresponds to at least one of (a) at least one first token for a first search term or (b) at least one second token for a second search term;
computing a plurality of document error lists for one or more paths that reaches a leaf node in the next valid character tree, the plurality of document error lists comprising a first document error list and a second document error list, wherein (a) the first error list comprises one or more instances of first error list information, each instance of first error list information comprising a first document identifier and a first error distance, (b) the second error list comprises one or more instances of second error list information, each instance of second error list information comprising a second document identifier and a second error distance, (c) the first document identifier is associated with a document that comprises at least one instance of the at least one first token, and (d) the second document identifier is associated with a document that comprises at least one instance of the at least one second token; and comparing the plurality of document error lists to identify an instance of first error list information and an instance of second error list information, wherein (a) the first document identifier and the second document identifier are a common document identifier and (b) at least one of (i) the first error distance satisfies an error distance threshold and the second error distance satisfies the error distance threshold or (ii) the sum of the first error distance and the second error distance satisfies the error distance threshold.

17. The non-transitory computer readable medium of claim 16, the instructions further configured to cause the processor to perform:

adding the common document identifiers to a result set; and providing the result set of document identifiers.

18. The non-transitory computer readable medium of claim 16, the instructions further configured to cause the processor to perform:

retrieving one or more documents associated with the set of document identifiers.

19. The non-transitory computer readable medium of claim 16, wherein the plurality of document error lists correspond to geographic search terms.

20. The non-transitory computer readable medium of claim 16, wherein at least one of the geographic search terms are associated with a destination.

* * * * *